J. CROWTHER,
Cultivator.
No. 75,127.
Patented March 3, 1868.
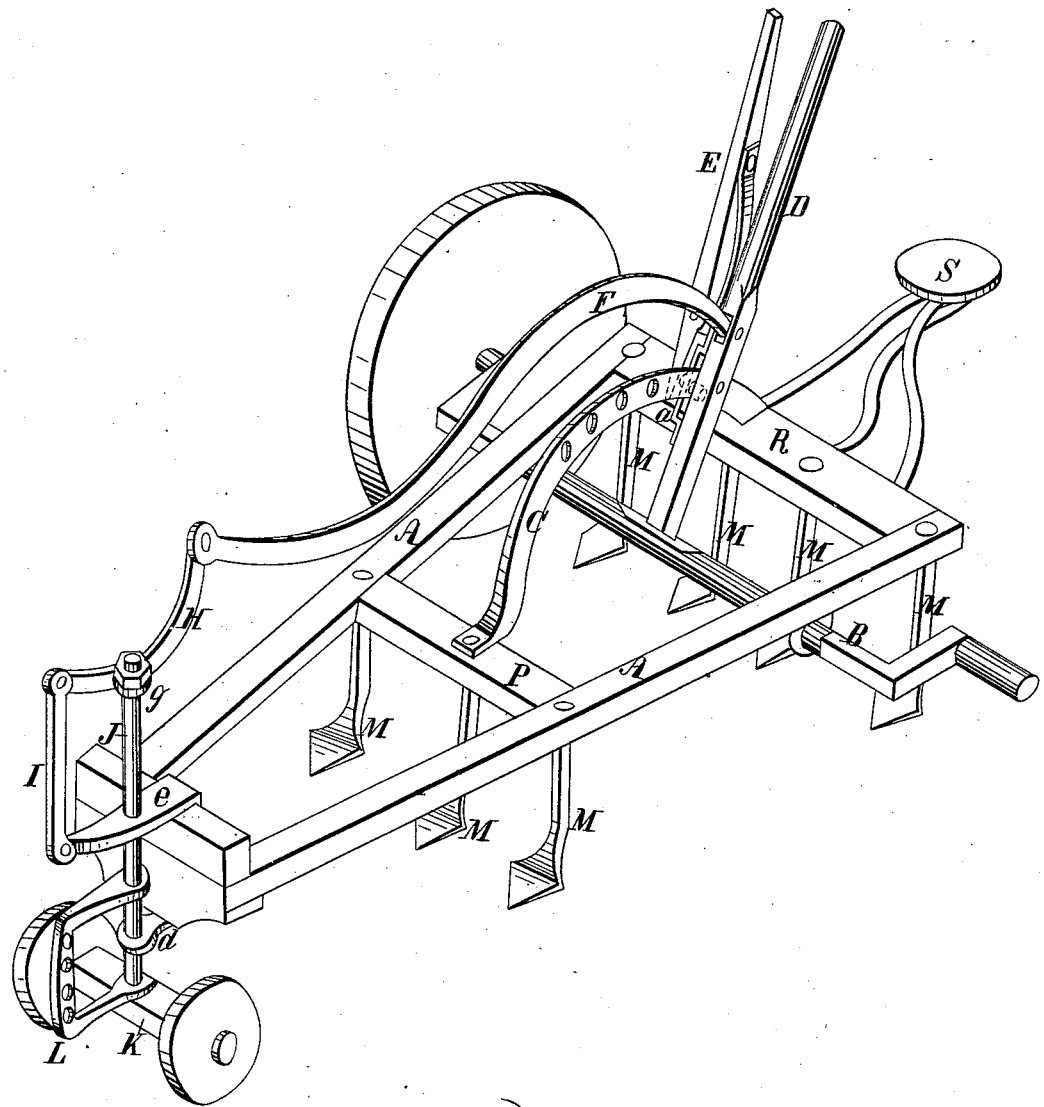

United States Patent Office.

JOHN CROWTHER, OF OXFORD, MICHIGAN.

Letters Patent No. 75,127, dated March 3, 1868.

IMPROVEMENT IN CULTIVATORS.

*The Schedule referred to in these Letters Patent and making part of the same.*

TO ALL WHOM IT MAY CONCERN:

Be it known that I, JOHN CROWTHER, of Oxford, in the county of Oakland, and in the State of Michigan, have invented certain new and useful Improvements in Cultivators; and do hereby declare that the following is a full, clear, and exact description thereof, reference being had to the accompanying drawings, and to the letters of reference marked thereon.

In the annexed drawings, making part of this specification, A A represent the frame of the machine, the forward end of which is supported upon an axle, K, which is provided with two wheels, and the rear end being supported upon a crank-axle, B, which is also provided with two wheels. M M represent cultivator-teeth, which are secured in proper order to the under side of the cross-pieces of the frame. To the centre of the crank-axle B is secured a lever, D. E represents a supplementary lever, which is pivoted to lever D, having a spring to throw its upper end away from the lever D, and having a pin on its lower end, which takes into a hole in a loop a. The loop a is secured to one side of lever D, and a curved bar, C, with one end secured to cross-piece P, and the other to the cross-piece R passes through loop a. The curved bar C is provided with holes, as seen, and the pin upon lever E, passing the hole in loop a, takes into one of the holes of this bar C, and thus stations the lever D, and with it the axle B, in any desired position.

J represents a shaft, which stands in a vertical position, and the lower end of which is made fast to the axle K. This shaft passes through and has bearing in two plates, e and d, which are secured to the forward end of the frame, as seen. L represents a clevis, which is secured permanently to the shaft J. F represents a connecting-bar, one end of which is pivoted to lever D, and the other to a lever, H. The lever H has its fulcrum upon the arm of a collar, g, which said collar surrounds and is secured to the upper end of shaft J. I represents a bar, one end of which is pivoted to the forward end of lever H, and the other to the outer end of plate e.

The object of this arrangement is to raise and lower the frame A, with its teeth, at the will of the operator, who rests upon the seat S, at the rear of the frame. When the operator, who sits back of lever D, draws said lever toward him, he turns the axle B in such a manner as to raise the rear of the frame, while he at the same time draws the bar F, so as to throw up the forward end of lever H, and, by means of bar I, to raise the forward end of the frame, the shaft J taking an endwise movement downward through the plates d and e.

The two axles, K and B, are thus so connected that by a movement of the lever D they are both acted upon at the same time, and the frame is raised or lowered at the will of the operator, as the nature of the case may demand. The lever D is stationed at any desired point by means of the pin on the lower end of lever E.

Having thus fully described my invention, what I claim as new, and desire to secure by Letters Patent, is—

Raising and lowering the frame A by means of levers D and H, and bars C, F, and I, and shaft J, substantially as herein specified.

In testimony that I claim the foregoing, I have hereunto set my hand, this 5th day of July, 1867.

JOHN CROWTHER.

Witnesses:
L. W. STANTON,
JOS. A. TREAT.